(12) United States Patent
Sasai

(10) Patent No.: US 7,751,722 B2
(45) Date of Patent: Jul. 6, 2010

(54) OPTICAL TRANSMISSION SYSTEM

(75) Inventor: Hiroyuki Sasai, Katano (JP)

(73) Assignee: Panasonic Corporation, Osaka (JP)

( * ) Notice: Subject to any disclaimer, the term of this patent is extended or adjusted under 35 U.S.C. 154(b) by 876 days.

(21) Appl. No.: 10/537,171

(22) PCT Filed: Feb. 6, 2004

(86) PCT No.: PCT/JP2004/001266

§ 371 (c)(1),
(2), (4) Date: Jun. 1, 2005

(87) PCT Pub. No.: WO2004/070976

PCT Pub. Date: Aug. 19, 2004

(65) Prior Publication Data

US 2006/0045535 A1    Mar. 2, 2006

(30) Foreign Application Priority Data

Feb. 7, 2003    (JP)    ............................. 2003-031221

(51) Int. Cl.
*H04B 10/00*    (2006.01)
(52) U.S. Cl. ...................................... 398/163
(58) Field of Classification Search ......... 398/158–159, 398/163
See application file for complete search history.

(56) References Cited

U.S. PATENT DOCUMENTS

| | | | | |
|---|---|---|---|---|
| 5,410,404 A * | 4/1995 | Kersey et al. | ............... | 356/478 |
| 5,777,771 A | 7/1998 | Smith | | |
| 5,917,636 A | 6/1999 | Wake et al. | | |
| 6,404,528 B1 * | 6/2002 | Pfeiffer | ....................... | 398/202 |
| 6,647,176 B1 * | 11/2003 | Pua et al. | ....................... | 385/24 |
| 6,822,743 B2 * | 11/2004 | Trinh | ......................... | 356/451 |
| 7,260,330 B2 * | 8/2007 | Chew et al. | .................. | 398/154 |
| 2003/0198477 A1 * | 10/2003 | Kuri et al. | ..................... | 398/183 |

FOREIGN PATENT DOCUMENTS

| | | |
|---|---|---|
| CN | 1120377 A | 4/1996 |
| JP | 7-283793 | 10/1995 |
| JP | 10-117172 | 5/1998 |
| WO | WO 02/091644 | 11/2002 |

OTHER PUBLICATIONS

"Sampler of Multimedia Transmission Technique—Optical Fiber Transmission Technique" The Nikkan Kogyo Shinbun, Ltd. pp. 123-129 with verified English translation., Jun. 1995.
Helkey, Roger; Relative-Intensity-Noise Cancellation in Bandpass External-Modulation Links; IEEE Transactions on Microwave Theory and Techniques, vol. 46, No. 12, Dec. 1998, pp. 2083-2091.

* cited by examiner

*Primary Examiner*—Shi K Li

(57) ABSTRACT

To provide an optical transmission system which cancels out noise components and whose construction cost is lower than that of the conventional system, the present invention is an optical transmission system for transmitting an optical signal from an optical transmitter to an optical receiver and outputting an output electrical signal after a noise canceling process is performed. The optical receiver and transmitter are connected by one optical fiber, through which an optical signal is transmitted before being intensity-modulated. The optical receiver includes; a first processing unit receiving an optical signal, intensity-modulating the received optical signal, and splitting the intensity-modulated optical signal into two optical signals whose respective intensity-modulated components are in antiphase; first and second optical transmission fibers transmitting the two optical signals respectively; and a second processing unit converting the two optical signals into electrical signals respectively, and generating an output electrical signal by performing differential amplification.

8 Claims, 9 Drawing Sheets

1A

POLARIZATION OF
INCOMING LIGHT:
LINEAR POLARIZATION

POLARIZATION OF
INCOMING LIGHT:
LINEAR POLARIZATION

POLARIZATION OF
INCOMING LIGHT:
LINEAR POLARIZATION

OPTICAL TRANSMISSION SYSTEM

TECHNICAL FIELD

The present invention relates to an analog optical transmission technique used for an optical transmission in which an optical signal is intensity-modulated with use of a modulated electrical signal, more specifically relates to a technique for canceling out noise components which occur in an optical transmission system.

BACKGROUND ART

A technique for performing a high-quality optical transmission in an optical transmission system, which realizes a high-speed transmission with use of optical fibers, is disclosed by Document 1.

According to this document, the optical transmission system includes an optical transmitter and an optical receiver, which are connected to each other by two optical fibers.

The optical transmitter intensity-modulates an optical signal based on a radio frequency signal (hereinafter called the "RF signal") that requires to be transmitted. Then, the optical transmitter generates two optical signals in antiphase from the intensity-modulated optical signal, and separately transmits the generated two optical signals to the optical receiver via the respective optical fibers.

The optical receiver receives the two optical signals from the optical transmitter via the respective optical fibers, and converts the received two optical signals into electrical signals respectively. Then, the optical receiver changes one of the electrical signals to be in antiphase, and adds the changed electrical signal in antiphase to the other electrical signal.

According to this operation, the RF signals in antiphase, which are the intensity-modulated components of the two optical signals received from the optical transmitter, become in in phase after converted into electrical signals, and these electrical signals in in phase are to be added to each other. On the contrary, two optical-signal noise components in in phase received from the optical transmitter are to be in antiphase at the time of the addition. Therefore, the noise components cancel out each other. This realizes a high-quality optical transmission.

However, with the above-described optical transmission system, two optical fibers are required between the optical transmitter and the optical receiver for canceling out the noise components. This is a cause of the high cost for constructing an optical transmission system. Therefore, it is difficult to apply the conventional optical transmission system to systems for commercial use.

Document 1

"IEEE TRANSACTIONS ON MICROWAVE THEORY AND TECHNIQUES", published by IEEE, VOL. 46, NO. 12, PP. 2083-2091, DECEMBER 1998.

DISCLOSURE OF THE INVENTION

The present invention aims to provide an optical transmission system which cancels out noise components and whose construction cost is lower than that of the conventional system.

The object can be achieved by an optical transmission system in which an optical signal is transmitted from an optical transmitter to an optical receiver and outputted in a form of an output electrical signal after a noise canceling process is performed, the noise canceling process canceling out noise components which occur during the transmission, wherein the optical receiver and the optical transmitter are connected to each other by one optical fiber, through which an optical signal is transmitted before being intensity-modulated, the optical receiver includes: a first processing unit operable to receive an optical signal, intensity-modulate the received optical signal, and split the intensity-modulated optical signal into two optical signals of which respective intensity-modulated components are in antiphase; first and second optical transmission fibers which transmit the two optical signals respectively; and a second processing unit operable to convert the two optical signals into electrical signals respectively, and generate an output electrical signal by performing differential amplification on the electrical signals.

According to the stated construction, the optical receiver of the optical transmission system can intensity-modulate the received optical signal, generate two optical signals of which the intensity-modulated components are in antiphase with each other, convert the generated two optical signals into electrical signals respectively, and generate the output electrical signal. Accordingly, the optical receiver does not need to receive two optical signals of which the intensity-modulated components are in antiphase with each other, which is different from the conventional optical transmission system. In other words, the optical transmitter and the optical receiver do not need to be connected to each other by two optical fibers, and the construction cost can be reduced. Also, when the optical signals, of which the intensity-modulated components are in antiphase with each other, are converted into electrical signals and the phase of one of the electrical signals is inverted, the two electrical signals become in in phase and the noise components thereof become in anti-phase. Accordingly, the noise components are cancelled out when the output electrical signal is generated, and a high-quality output electrical signal can be realized.

BEST MODE FOR CARRYING OUT THE INVENTION

1. The First Embodiment

The following is a description of an optical transmission system 1 according to the first embodiment of the present invention.

Figure 1:
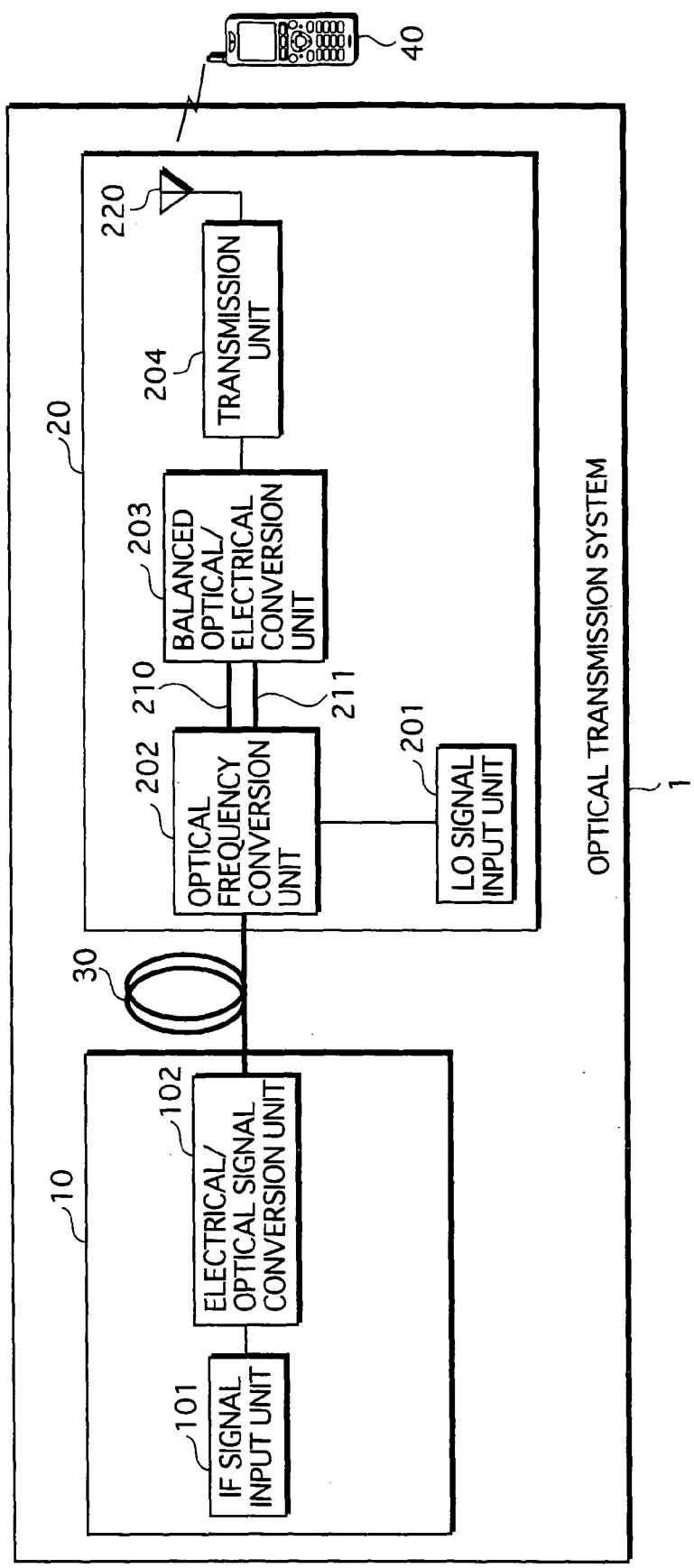
FIG. 1 is a block diagram showing a structure of an optical transmission system 1.

As FIG. 1 shows, the optical transmission system 1 includes an optical transmitter 10, an optical receiver 20, and an optical fiber 30. The optical transmitter 10 and the optical receiver 20 are connected to each other by the optical fiber 30.

The optical transmitter 10 converts an intermediate frequency signal (hereinafter called the "IF signal") into an optical signal, and transmits the optical signal to the optical receiver 20 via the optical fiber 30. The optical receiver 20 receives the optical signal from the optical transmitter 10 via the optical fiber 30, and converts the IF signal into an RF signal with use of the received optical signal. Then, the optical receiver 20 transmits the RF signal to a mobile telephone 40. The IF signal is an electrical signal having a frequency which is different from that of the RF signal. Generally, the frequency of the IF signal is lower than that of the RF signal.

1.1 Structure of the Optical Transmitter 10

As FIG. 1 shows, the optical transmitter 10 includes an IF signal input unit 101 and an E/O (electrical/optical) conversion unit 102.

(1) IF Signal Input Unit 101

The IF signal input unit 101 receives an IF signal which should be transmitted to the optical receiver 20, and outputs the received IF signal to the E/O conversion unit 102.

(2) E/O Conversion Unit 102

The E/O conversion unit 102 is, more specifically, a semiconductor laser module. Receiving an IF signal from the IF signal input unit 101, the E/O conversion unit 102 converts the received IF signal into an optical signal, and outputs the generated optical signal to the optical receiver 20 via the optical fiber 30.

With a description of the semiconductor laser module, the following briefly explains how the E/O conversion unit 102 realizes the E/O conversion.

The semiconductor laser module usually includes a laser chip, a monitor PD for controlling an optical signal to be at a certain output level, a peltier cooler for temperature control, an isolator for preventing reflection, and first and second lenses.

When receiving an IF signal, the semiconductor laser module converts the IF signal into an optical signal with use of the laser chip, and outputs the generated optical signal to the optical fiber via the first lens, the isolator, and the second lens in this order.

Note that although the semiconductor laser module has the isolator, the present invention is not limited to this. There may be a case where the semiconductor laser module does not have any isolator. In this case, the semiconductor laser module outputs the generated optical signal to the optical fiber via the first lens and the second lens in this order. Also, there may be a case where the semiconductor laser module does not have even a lens, and is directly connected to the optical fiber.

1.2 Structure of the Optical Receiver 20

As FIG. 1 shows, the optical receiver 20 includes an LO signal input unit 201, an optical frequency conversion unit 202, a balanced O/E (optical/electrical) conversion unit 203, and a transmission unit 204. The optical frequency conversion unit 202 and the balanced O/E conversion unit 203 are connected to each other by optical fibers 210 and 211.

(1) LO Signal Input Unit 201

The LO signal input unit 201 receives a local oscillator signal (hereinafter called the "LO signal") having a certain frequency for intensity-modulating the optical signal received from the optical transmitter 10, and outputs the received LO signal to the optical frequency conversion unit 202.

Here, the frequency of the LO signal is the same as that of the RF signal (hereinafter called the "RF frequency").

(2) Optical Frequency Conversion Unit 202

Figure 2:
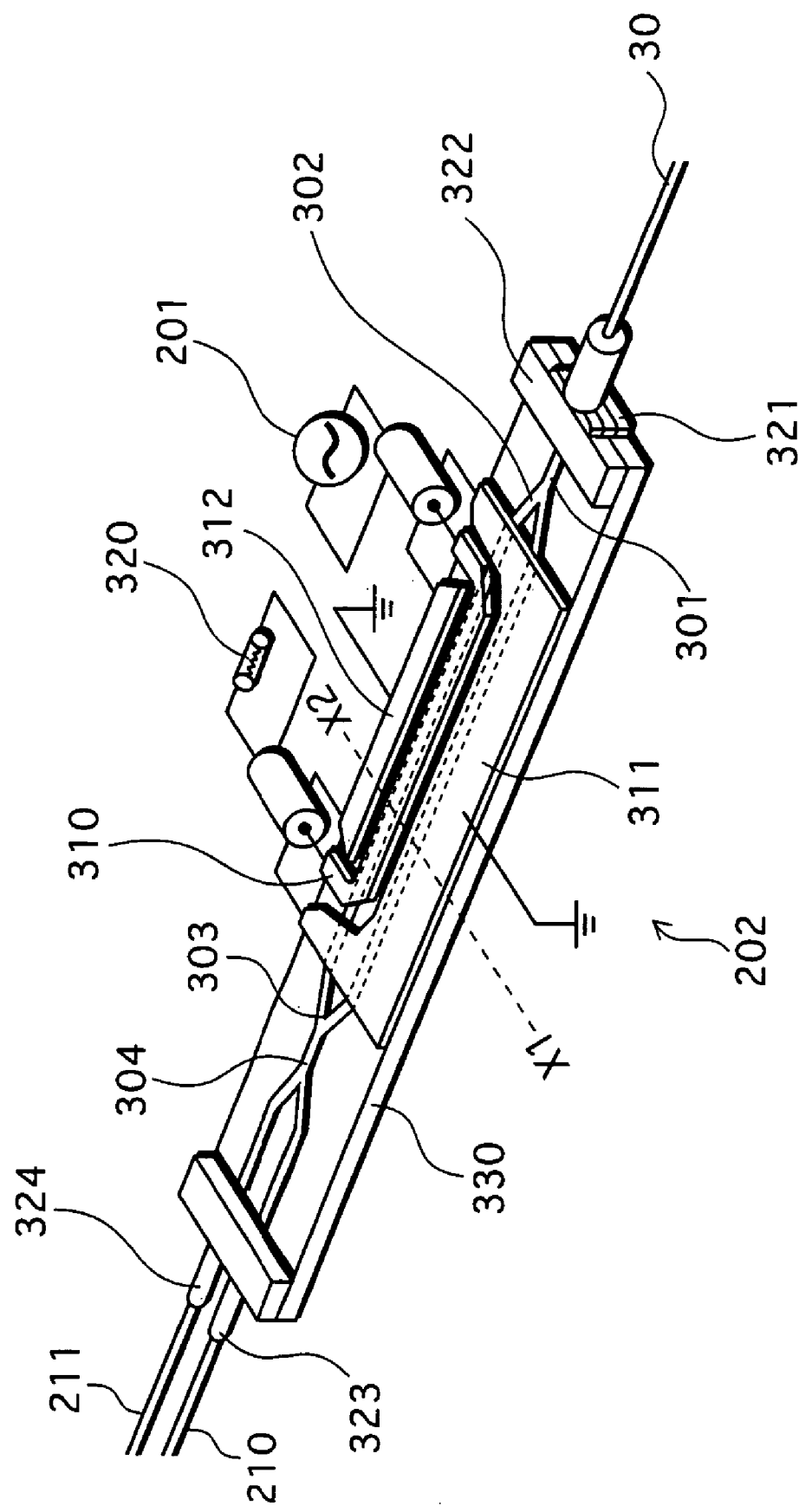
FIG. 2 shows a structure of an optical frequency conversion unit 202.

The optical frequency conversion unit 202 is, more specifically, a chirp type Mach-Zehnder external modulator. FIG. 2 shows the structure of the optical frequency conversion unit 202, and FIG. 3 shows a sectional view of the optical frequency conversion unit 202 cut along the line X1-X2 in FIG. 2.

Figure 3:
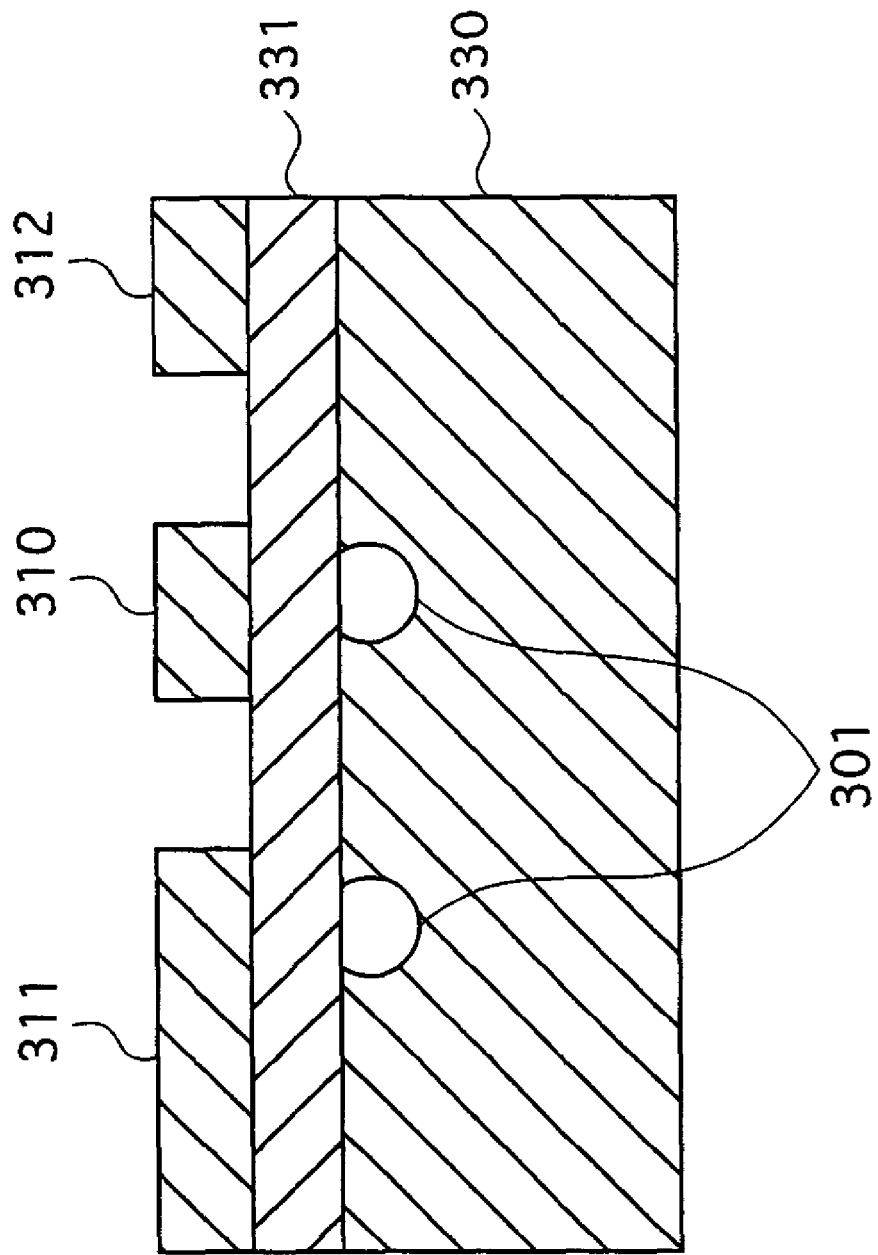
FIG. 3 is a sectional view of the optical frequency conversion unit 202.

As FIG. 2 and FIG. 3 show, the optical frequency conversion unit 202 includes a z-cut LN substrate layer 330 generated with use of lithium niobate crystal (hereinafter called "LN"), a waveguide 301, a hot electrode 310, ground electrodes 311 and 312, a terminating resistance 320, a polarizer 321, an LN block 322, glass capillaries 323 and 324, and a buffer layer 331 made of silicon dioxide.

The waveguide 301 is formed by thermal diffusion of titanium (Ti) onto the surfaces of the LN substrate layer 330. One end of the waveguide 301 is connected to the optical fiber 30 via the polarizer 321, and the other end is branched into two waveguides (hereinafter called "the first waveguide" and "the second waveguide") at a Y-branch point 302. The first and second waveguides are recombined at a combining point 303, and then branched again at a Y-branch point 304 into two waveguides (hereinafter called "the third waveguide" and "the fourth waveguide"). The third and fourth waveguides are connected to the optical fibers 210 and 211 via the glass capillaries 323 and 324 respectively.

The distance between a reception point where the waveguide 301 receives an optical signal from the optical fiber, and the Y-branch point 302 where the waveguide 301 is branched into the first and the second waveguides is a half of the perfect coupling length. Also, the distance between the combining point 303 and the Y-branch point 304 where the waveguide 301 is branched into the third and the fourth waveguides is a half of the perfect coupling length. With this structure, the Y-branch points 302 and 304 have the same function as a 3 dB coupler has. In other words, at the Y-branch points 302 and 304, the received photoelectric power is to be divided into two halves. The axiom of dividing photoelectric power into two halves is in the public domain, and therefore the description is omitted here.

As FIG. 3 shows, when the LN substrate layer 330 is in z-cut, the hot electrode 310 and the ground electrode 311 included in the optical frequency conversion unit 202 are disposed right above the two waveguides 301 which are branched at the Y-branch point 302 (In this embodiment, the ground electrode 311 is disposed above the first waveguide, and the hot electrode 310 is disposed above the second waveguide). For avoiding an absorption loss of light passing through the first and second waveguides caused by an influence of metal electrodes, the buffer layer 331 is disposed between (i) the hot electrodes 311, ground electrodes 311 and 312, and (ii) the LN substrate layer 330. Note that although the buffer layer 331 disposed between (i) the hot electrodes 311, ground electrodes 311 and 312, and (ii) the LN substrate layer 330 is omitted in FIG. 2 for simplifying the description of the optical frequency conversion unit 202, the buffer layer 331 is disposed between (i) the hot electrodes 311, ground electrodes 311 and 312, and (ii) the LN substrate layer 330 as FIG. 3 shows.

One end of the hot electrode 310 is connected to the LO signal input unit 201, and the other end is connected to the terminating resistance 320. The ground electrodes 311 and 312 are earthed.

Receiving an optical signal from the optical transmitter 10 via the optical fiber 30, the optical frequency conversion unit 202 branches the received optical signal into the first and second waveguides in such a manner that the divided photoelectric powers become equal to each other. Then, the optical frequency conversion unit 202 causes electric fields between the hot electrode 310 and the ground electrode 311, and between hot electrode 310 and the ground electrode 312, by applying an LO signal, which is received by the LO signal input unit 201, to the hot electrode 310. This operation changes refractive indexes of the first and second waveguides. Also, the phase values of optical signals, which pass through the first and second waveguides, are to be increased by values of $\Phi$ and $-\Phi$ respectively. The optical frequency conversion unit 202 combines the two optical signals of which the phases have been changed, make them interfere to each other in order to intensity-modulate the optical signal received from the optical transmitter 10, and thereby generate an optical signal which is intensity-modulated (hereinafter called "the intensity-modulated optical signal"). By applying the LO signal to the hot electrode 310, the frequency of the intensity-modulated component is converted from that of the IF signal (hereinafter called "the IF frequency") to the RF frequency.

At the Y-branch point 304, the optical frequency conversion unit 202 branches the intensity-modulated optical signal into optical signals, one of which is an optical signal whose intensity-modulated component is in antiphase with the intensity-modulated component of the intensity-modulated optical signal 340 (hereinafter called "the first optical signal"), and the other of which is an optical signal whose intensity-modulated component is in in phase with the intensity-modulated component of the intensity-modulated optical signal 341 (hereinafter called "the second optical signal"). The first optical signal 340 is outputted through the third waveguide to the balanced O/E conversion unit 203 via the optical fiber 210, and the second optical signal 341 is outputted through the fourth waveguide to the balanced O/E conversion unit 203 via the optical fiber 211.

Note that the axiom of the intensity modulation and the axiom of that the intensity-modulated components of the first optical signal 340 and the second optical signal 341 become in antiphase are in the public domain, and therefore a detailed description for those axioms are omitted here. Those are described in "Sampler of Multimedia Transmission Technique—Optical Fiber Transmission Technique" (The Nikkan Kogyo Shinbun, Ltd.) written by Yoshihiro Konishi and Takaya Yamamoto.

(3) Balanced O/E Conversion Unit 203

The balanced O/E conversion unit 203 converts the first and second optical signals, which are received from the optical frequency conversion unit 202 via the optical fiber 210 and 211, into electrical signals, and generates an RF signal from the electrical signals. Hereinafter, the electrical signals converted from the first and second optical signals are called the "first RF signal" and the "second RF signal" respectively.

Figure 4:
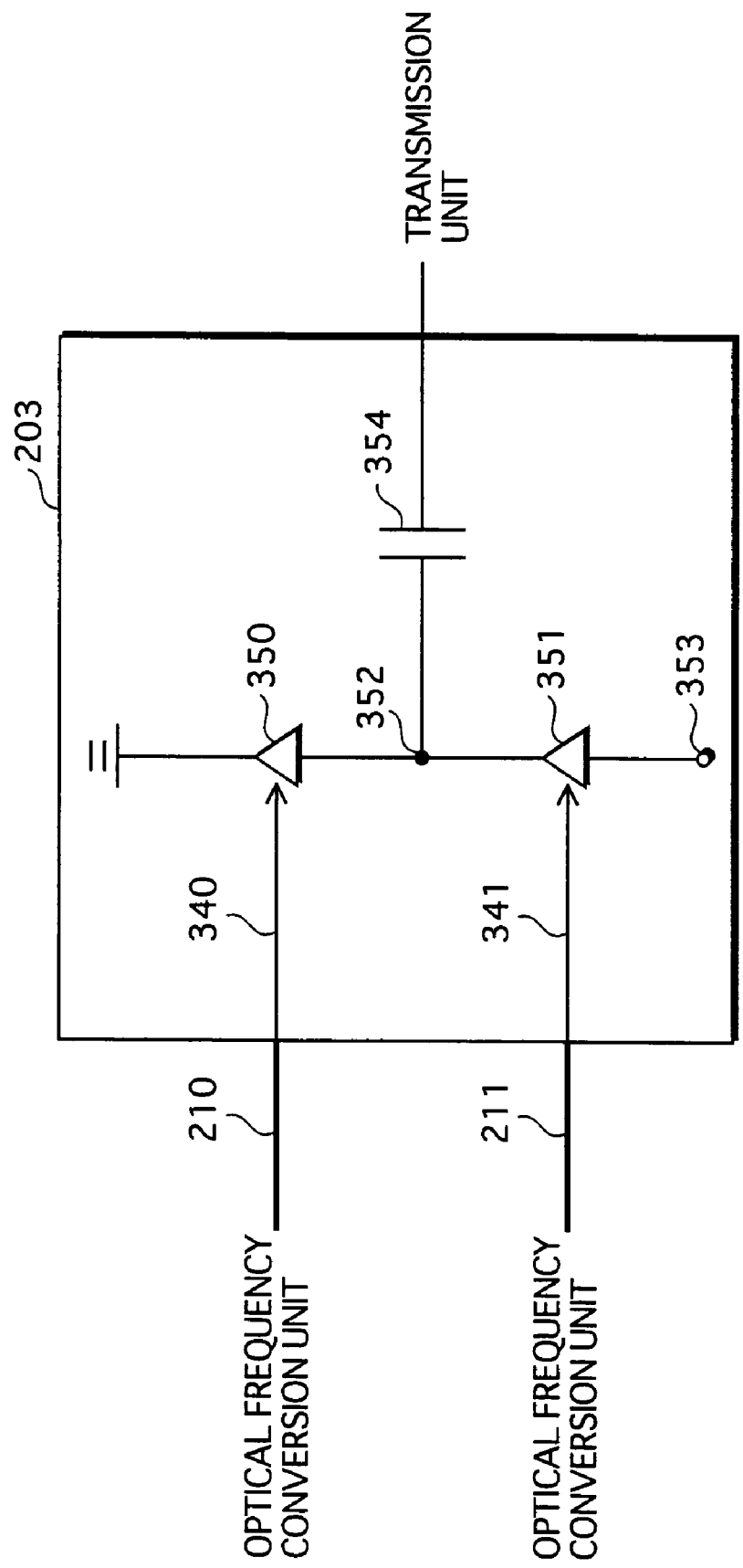
FIG. 4 is a block diagram showing a structure of a balanced optical/electrical conversion unit 203.

As an example shown in FIG. 4, the balanced O/E conversion unit 203 includes first photodiode (hereinafter called "the first PD") 350, the second photodiode (hereinafter called "the second PD") 351, a power supply voltage unit 353, and a condenser 354. The first PD and the second PD are series-connected to a connection point 352, and the other end of the first PD is earthed, and the other end of the second PD is connected to the power supply voltage unit 353.

Receiving the first optical signal 340 from the optical frequency conversion unit 202 via optical fiber 210, the first PD 350 converts the received first optical signal 340 and generates the first RF signal. Receiving the second optical signal 341 from the optical frequency conversion unit 202 via optical fiber 211, the second PD 351 converts the received second optical signal 341, and thereby generates the second RF signal.

At the connection point 352, the first RF signal and the second RF signal in in phase are added to each other, and thereby an RF signal is generated. The first and second RF signals are in in phase because the first RF signal generated by the first PD 350 is outputted in direction toward the power supply voltage unit 353 and therefore the phase of the first RF signal is to be inverted. Accordingly, the first RF signal becomes in in phase with the second RF signal generated by the second PD 351.

In the same manner as the conventional technique, noise components in the first and second optical signals received by the balanced O/E conversion unit 203 are in in phase, and therefore noise components outputted by the first PD 350 and the second PD 351 become in antiphase. Because of this, the noise components cancel out each other at the connection point 352.

The balanced O/E conversion unit 203 outputs the RF signal generated by the connection point 352 to a transmission unit 204 via the condenser 354.

(4) Transmission Unit 204

The transmission unit 204 includes an antenna 220. The transmission unit 204 receives the RF signal from the balanced O/E conversion unit 203 and transmits received RF signal to a mobile telephone 40 via the antenna 220.

1.3 Operation of the Optical Transmission System 1

Receiving an IF signal which requires transmission from the IF signal input unit 101, the E/O conversion unit 102 in the optical transmitter 10 converts the received IF signal into an optical signal, and transmits the generated optical signal to the optical receiver 20 via the optical fiber 30.

The optical frequency conversion unit 202 in the optical receiver 20 receives an optical signal from the optical transmitter 10 via the optical fiber 30, and intensity-modulates the received optical signal in order to generate the intensity-modulated optical signal. Then, the optical frequency conversion unit 202 generates the first optical signal and the second optical signal from the intensity-modulated optical signal, and transmits the generated first and second optical signals to the balanced O/E conversion unit 203 via the optical fiber 210 and the optical fiber 211 respectively.

Receiving the first and second optical signals from the optical frequency conversion unit 202 with use of the first PD 350 and the second PD 351 respectively, the balanced O/E conversion unit 203 converts the received first and second optical signals into the first and second RF signals respectively. Then, the balanced O/E conversion unit 203 generates the RF signal by adding the first RF signal and the second RF signal in in phase at the connection point 352, and transmits the generated RF signal to the transmission unit 204. Receiving the RF signal from the balanced O/E conversion unit 203, the transmission unit 204 transmits the received RF signal to the mobile telephone 40 via the antenna 220.

By these operations, the RF signals, which are intensity-modulated components of the two optical signals, are added to each other, and noise components cancel out each other. This realizes a high-quality optical transmission.

1.4 Summary of the First Embodiment

As described above, the optical transmission system 1 needs only one optical fiber between the optical transmitter 10 and the optical receiver 20, and therefore its construction cost is lower than that of the conventional optical transmission system. Further, the optical receiver 20 can generate an RF signal in which noise components are canceled out with use of the optical frequency conversion unit 202 and the balanced O/E conversion unit 203.

Also, in the conventional optical transmission system, the delay time between the two optical signals, which are transmitted from the optical transmitter to the optical receiver via respective optical fibers, should be controlled to have the same optical phase. However, in the optical transmission system 1, the phase delay time is required to be controlled only in the optical receiver 20, and therefore the control becomes easier by using an integration method and so on.

Note that although electric fields are caused in both the first waveguide and the second waveguide in the optical frequency conversion unit 202, the structure is not limited to this. A structure in which electric field is caused in only one of the first and second waveguides is allowable.

Also, although the above-described optical frequency conversion unit 202 has only one hot electrode, the structure is not limited to this. The optical frequency conversion unit 202 may be a two-electrode type which has two hot electrodes. The operation of the two-electrode type is the same as that of the above-described type in which the optical frequency conversion unit 202 has only one hot electrode, and the intensity-modulated component of the intensity-modulated optical signal which is generated by the intensity modulation has the RF frequency.

Also, although the above-described optical frequency conversion unit 202 is a chirp type Mach-Zehnder external modulator, the optical frequency conversion unit 202 may be a zero-chirp type Mach-Zehnder external modulator. The operation of the zero-chirp type Mach-Zehnder external modulator is the same as that of the chirp type Mach-Zehnder external modulator.

Also, although one end of the first PD is earthed and one end of the second PD is connected to the power supply voltage unit 353, the structure is not limited to this. The end of the first PD may be connected to the power supply voltage unit 353 and the end of the second PD may be earthed. An RF signal in which the noise components are canceled out can be generated with this structure.

Also, although a Y-branch is used for branching off the optical signal received from the optical transmitter 10, a device that can branch the received optical signal in such a manner that the divided photoelectric powers become equal to each other may be used. Also for branching off the intensity-modulated optical signal, a device that can branch the received optical signal in such a manner that the divided photoelectric powers become equal to each other may be used instead of the Y-branch. For example, a 3 dB coupler can be used instead of the Y-branch.

2. The Second Embodiment

The following is a description of an optical transmission system 1A according to the second embodiment of the present invention.

Figure 5:
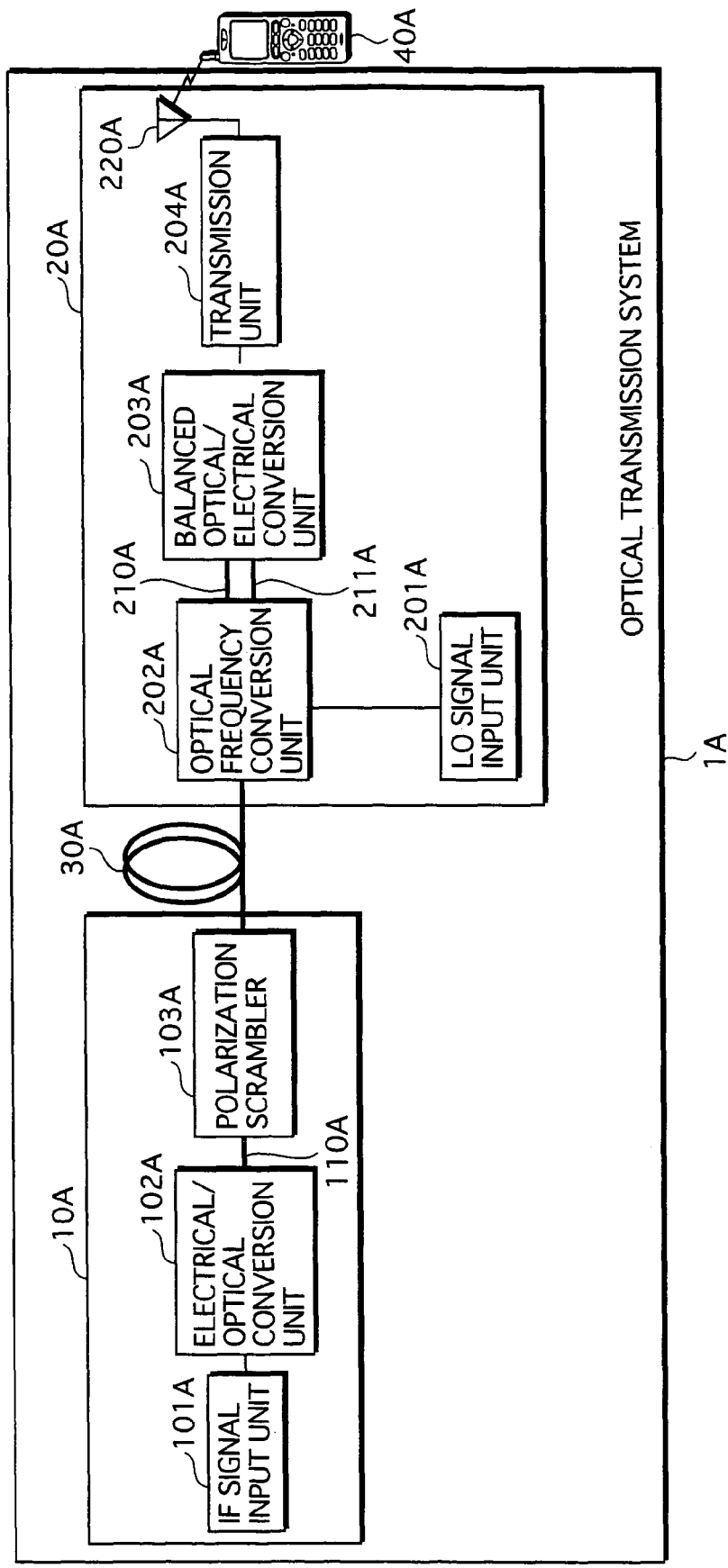
FIG. 5 is a block diagram showing a structure of an optical transmission system 1A.

As FIG. 5 shows, the optical transmission system 1A incldues an optical transmitter 10A, an optical receiver 20A, and an optical fiber 30A. The optical transmitter 10A and the optical receiver 20A are connected to each other by the optical fiber 30A.

The optical transmitter 10A converts an IF signal into an optical signal, change the optical signal to be a non-polarized signal, and then transmits the non-polarized optical signal to the optical receiver 20A via the optical fiber 30A. The optical receiver 20A receives the non-polarized optical signal from the optical transmitter 10A via the optical fiber 30A, and converts an IF signal into an RF signal with use of the received non-polarized optical signal. Then, the optical receiver 20A transmits the RF signal to a mobile telephone 40A.

2.1 Structure of the Optical Transmitter 10A

As FIG. 5 shows, the optical transmitter 10A includes an IF signal input unit 101A, an E/O (electrical/optical) conversion unit 102A, and a polarization scrambler 103A. The E/O conversion unit 102A and the polarization scrambler 103A are connected to each other by an optical fiber 110A.

(1) IF Signal Input unit 101A

The IF signal input unit 101A receives an IF signal which should be transmitted to the optical receiver 20A, and outputs the received IF signal to the E/O conversion unit 102A.

(2) E/O Conversion Unit 102A

The E/O conversion unit 102A is, more specifically, a semiconductor laser module. Receiving an IF signal from the IF signal input unit 101A, the E/O conversion unit 102A converts the received IF signal into a linearly polarized optical signal, and outputs the generated optical signal to the polarization scrambler 103A.

(3) Polarization Scrambler 103A

The polarization scrambler 103A receives the optical signal from the E/O conversion unit 102A via the optical fiber 110A, and controls the received optical signal to be a non-polarized signal in which the polarization type changes randomly. Then, the polarization scrambler 103A outputs the controlled non-polarized optical signal to the optical receiver 20A via the optical fiber 30A.

The following is a description of the polarization scrambler 103A with reference to "Optical Communication Engineering 1" (Corona Publishing Co., Ltd.) written by Hatori, etc. as a cited document.

The polarization scrambler 103A is, more specifically, a polarization modulator. When receiving a linearly polarized incoming light, the polarization scrambler 103A applies two polarized waves at the same time, which are a TE polarized-wave and a TM polarized-wave being orthogonal to each other, and modulates the incoming light by changing the phase difference between the polarized waves with use of the applied voltage.

In order to cause the TE polarized-wave and the TM polarized-wave at the same time, the incoming light is linearly polarized and the incoming angle to an axis of a cross section of the wave guides in the polarization scrambler is set to 45°.

The propagation velocities are different between the polarized waves at the both ends of the waveguides, and therefore the phase difference at the output end changes to 0°, 45°, 90°, 135°, 180°, 135°, 90°, 45° and 0° in this order according to the applied voltages.

In accordance with this change, the light outputted from the polarization scrambler changes to a linearly-polarized type, a circularly-polarized type, an elliptically-polarized type, a circularly-polarized type, and a linearly-polarized type (which is orthogonal to the first linearly-polarized type) in this order and in the reversed order.

Figure 6A:
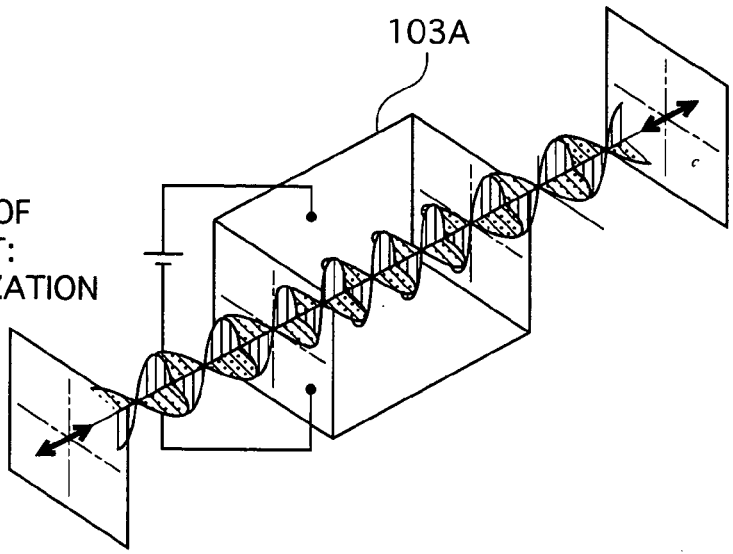
FIG. 6 shows an operation of a polarization scrambler 103A.
Figure 6B:
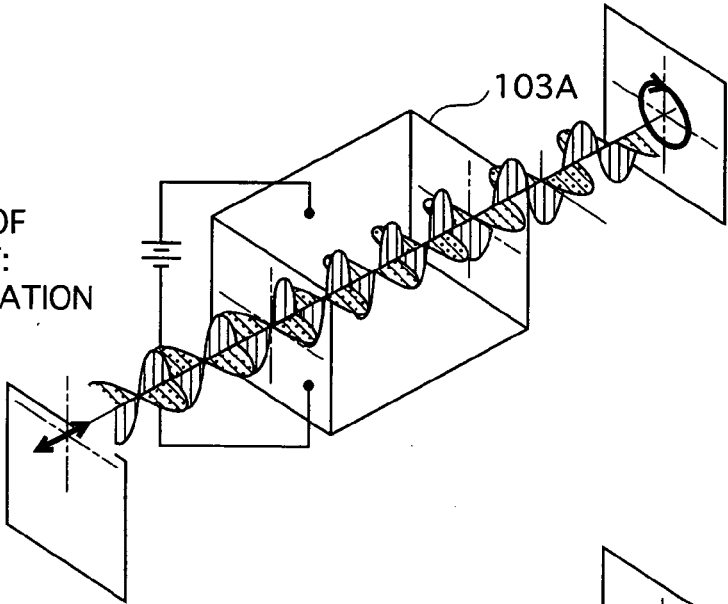
Figure 6C:
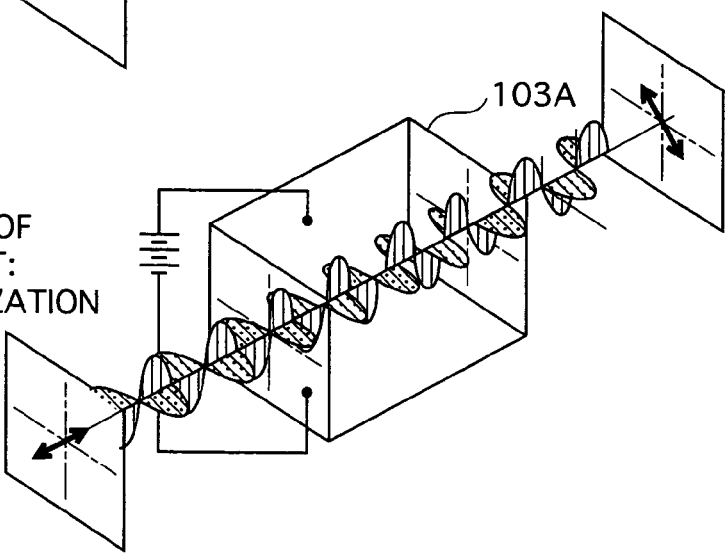

FIG. 6A shows a case where the phase difference between the polarized waves at the output end is 0°. FIG. 6B shows a case where the phase difference between the polarized waves at the output end is 90°, which is a case where the outputted light from the polarization scrambler 103A is circularly polarized. FIG. 6C shows a case where the phase difference between the polarized waves at the output end is 180°, which is a case where the outputted light from the polarization scrambler 103A is linearly polarized. FIG. 6A, 6B and 6C are described in the cited document.

The polarization scrambler 103A repeats this change $5 \times 10^9$ times per second, and makes the signal a non-polarized signal, in which the polarization type changes randomly.

2.2 Structure of the Optical Receiver 20A

As FIG. 5 shows, the optical receiver 20A includes an LO signal input unit 201A, an optical frequency conversion unit 202A, a balanced O/E (optical/electrical) conversion unit 203A and a transmission unit 204A having an antenna 220A. The optical frequency conversion unit 202A and the balanced O/E conversion unit 203A are connected to each other by optical fibers 210A and 211A.

The LO signal input unit 201A, the balanced O/E conversion unit 203A and the transmission unit 204A are the same as the LO signal input unit 201, the balanced O/E conversion unit 203 and the transmission system unit 204 respectively, and therefore the descriptions are omitted here.

(1) Optical Frequency Conversion Unit 202A

The optical frequency conversion unit 202A is, more specifically, a chirp type Mach-Zehnder external modulator, and its structure is the same as that of the optical frequency conversion unit 202 described in the first embodiment of the present invention.

The optical frequency conversion unit 202A receives an optical signal, which is controlled to be a non-polarized signal, from the optical transmitter 10A via the optical fiber 30A. Then, the optical frequency conversion unit 202A generates the intensity-modulated optical signal by intensity-modulating the controlled non-polarized signal with use of an LO signal received from the LO signal input unit 201A just as the optical frequency conversion unit 202 in the first embodiment does, and generates the first optical signal and the second optical signal from the generated intensity-modulated optical signal. The optical frequency conversion unit 202A outputs the generated first optical signal to the balanced O/E conversion unit 203A via the optical fiber 210A, and outputs the generated second optical signal to the balanced O/E conversion unit 203A via the optical fiber 211A.

2.3 Operation of the Optical Transmission System 1A

When receiving the IF signal, which is received from the IF signal input unit 101A and should be transmitted, the E/O conversion unit 102A in the optical transmission system 10A converts the received IF signal into an optical signal, and transmits the generated optical signal to the polarization scrambler 103A. Receiving the optical signal from the E/O conversion unit 201, the polarization scrambler changes the received optical signal to a non-polarized signal, and outputs the non-polarized signal to the optical receiver 20A via the optical fiber 30A.

The optical frequency conversion unit 202A in the optical receiver 20A receives the controlled non-polarized signal from the optical transmitter 10A via the optical fiber 30A. Then, the optical frequency conversion unit 202A generates an intensity-modulated optical signal by intensity-modulating the received optical signal, and generates the first optical signal and the second optical signal from the generated intensity-modulated optical signal. The optical frequency conversion unit 202A outputs the generated first and second optical signals to the balanced O/E conversion unit 203A via the optical fiber 210A and the optical fiber 211A respectively.

Receiving the first and second optical signals from the optical frequency conversion unit 202A, the balanced O/E conversion unit 203A converts the received first and second optical signals into the first and second RF signals respectively. Then, the balanced O/E conversion unit 203 generates the RF signal by reversing the phase of the first RF signal and adding the inverted first RF signal to the second RF signal, and outputs the generated RF signal to the transmission unit 204A. Receiving the RF signal from the balanced O/E conversion unit 203A, the transmission unit 204A transmits the received RF signal to the mobile telephone 40A via the antenna 220A.

Usually, in the external modulator, such as the optical frequency conversion unit 202A, the strength of inputted photoelectric power depends on the type of the plane of polarization of the optical signal. The combining efficiency which represents the ratio of the acceptable optical signal changes significantly depending on the type of the polarization. However, a half of the inputted optical signal can be combined by making the inputted optical signal a non-polarized signal. When an optical signal enters the external modulator, if the plane of polarization of the optical signal is orthogonal to a plane of polarization which the external modulator accepts, the photoelectric power of the incoming optical signal becomes "0". If the plane of polarization of the optical signal is the same as the plane of the polarization which the external modulator accepts, all the photo electric power of the optical signal is to be entered. When all the photoelectric power is "1", if the type of the plane of polarization of the incoming optical signal changes randomly, the photoelectric power becomes divided into two halves when the optical signal is divided by two orthogonal axes.

If the polarization of the optical signal is not controlled, the optical signal outputted from the optical transmitter 10A is linearly polarized, and depending on the condition of the optical fiber 30A, the combining efficiency might be worse. By controlling the optical signal to be non-polarized, the combining efficiency can be improved and becomes stable.

2.4 Summary of the Second Embodiment

As described above, the optical transmission system 1A needs only one optical fiber between the optical transmitter 10A and the optical receiver 20A, and therefore its construction cost is lower than that of the conventional optical transmission system. Further, the optical receiver 20A can generate an RF signal in which noise components are canceled out with use of the optical frequency conversion unit 202A and the balanced O/E conversion unit 203A.

Also, in the conventional optical transmission system, the delay time between the two optical signals, which are transmitted from the optical transmitter to the optical receiver via respective optical fibers, should be controlled to have the same optical phase. However, in the optical transmission system 1A, the phase delay time is required to be controlled only in the optical receiver 20A, and therefore the control becomes easier with user of an integration method and so on.

Also, with the optical transmission system 1A, the combining efficiency can be improved by controlling the polarization type of the optical signal, which is outputted from the optical transmitter 10A to the optical receiver 20A, to be non-polarized.

2.5 Modification of the Second Embodiment

The following is a description of an optical transmission system 1B as a modification of the second embodiment of the present invention.

Figure 7:
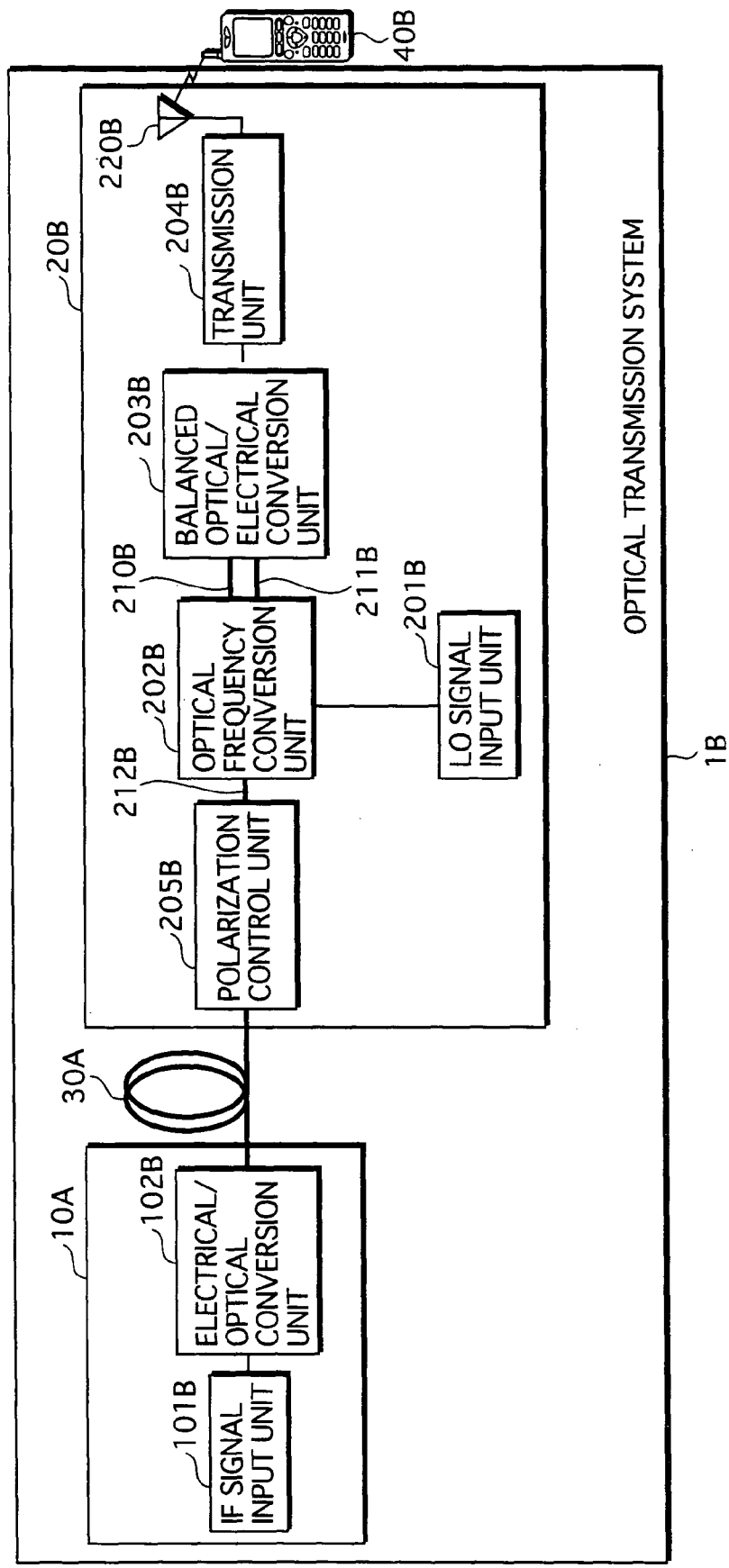
FIG. 7 is a block diagram showing a structure of an optical transmission system 1B.

As FIG. 7 shows, the optical transmission system 1B includes an optical transmitter 10B, an optical receiver 20B, and an optical fiber 30B. The optical transmitter 10B and the optical receiver 20B are connected to each other by the optical fiber 30B.

The optical transmitter 10B converts an IF signal into an optical signal, and transmits the optical signal to the optical receiver 20B via the optical fiber 30B. The optical receiver 20B receives the optical signal from the optical transmitter 10B via the optical fiber 30B, and converts an IF signal into an RF signal with use of the received optical signal. Then, the optical receiver 20B transmits the RF signal to a mobile telephone 40B.

2.5.1 Structure of the Optical Transmitter 10B.

As FIG. 7 shows, the optical transmitter 10B includes an IF signal input unit 101B and an E/O (electrical/optical) conversion unit 102B.

The IF signal input unit 101B and the E/O conversion unit 102B are the same as the IF signal input unit 101 and the E/O conversion unit 102 respectively. Therefore, the descriptions are omitted here.

2.5.2 Structure of the Optical Receiver 20B

As FIG. 7 shows, the optical receiver 20B includes an LO signal input unit 201B, an optical frequency conversion unit 202B, a balanced O/E (optical/electrical) conversion unit 203B, a transmission unit 204B having an antenna 220B, and a polarization control unit 205B. The optical frequency conversion unit 202B and the balanced O/E conversion unit 203B are connected to each other by optical fibers 210B and 211B, and the optical frequency conversion unit 202B and the polarization control unit 205B are connected to each other by a polarization maintaining fiber 212B. An example of the polarization maintaining fiber is a PANDA fiber.

The LO signal input unit 201B, the balanced O/E conversion unit 203B, and the transmission unit 204B are the same as the LO signal input unit 201, the balanced O/E conversion unit 203, and the transmission unit 204 respectively, and therefore the descriptions are omitted here.

Also, in an external modulator, such as the optical frequency conversion unit 202B, the strength of inputted photoelectric power depends on the plane of polarization of the optical signal. Note that in the following description, the optical frequency conversion unit 202B receives an optical signal which is horizontally polarized.

(1) Polarization Control Unit 205B

The polarization control unit 205B divides the received optical signal into a horizontal optical signal that is horizontally polarized and a vertical optical signal that is vertically polarized, and generates a horizontally polarized signal (hereinafter called the "combined optical signal") with use of the divided horizontal and vertical optical signals.

Figure 8:
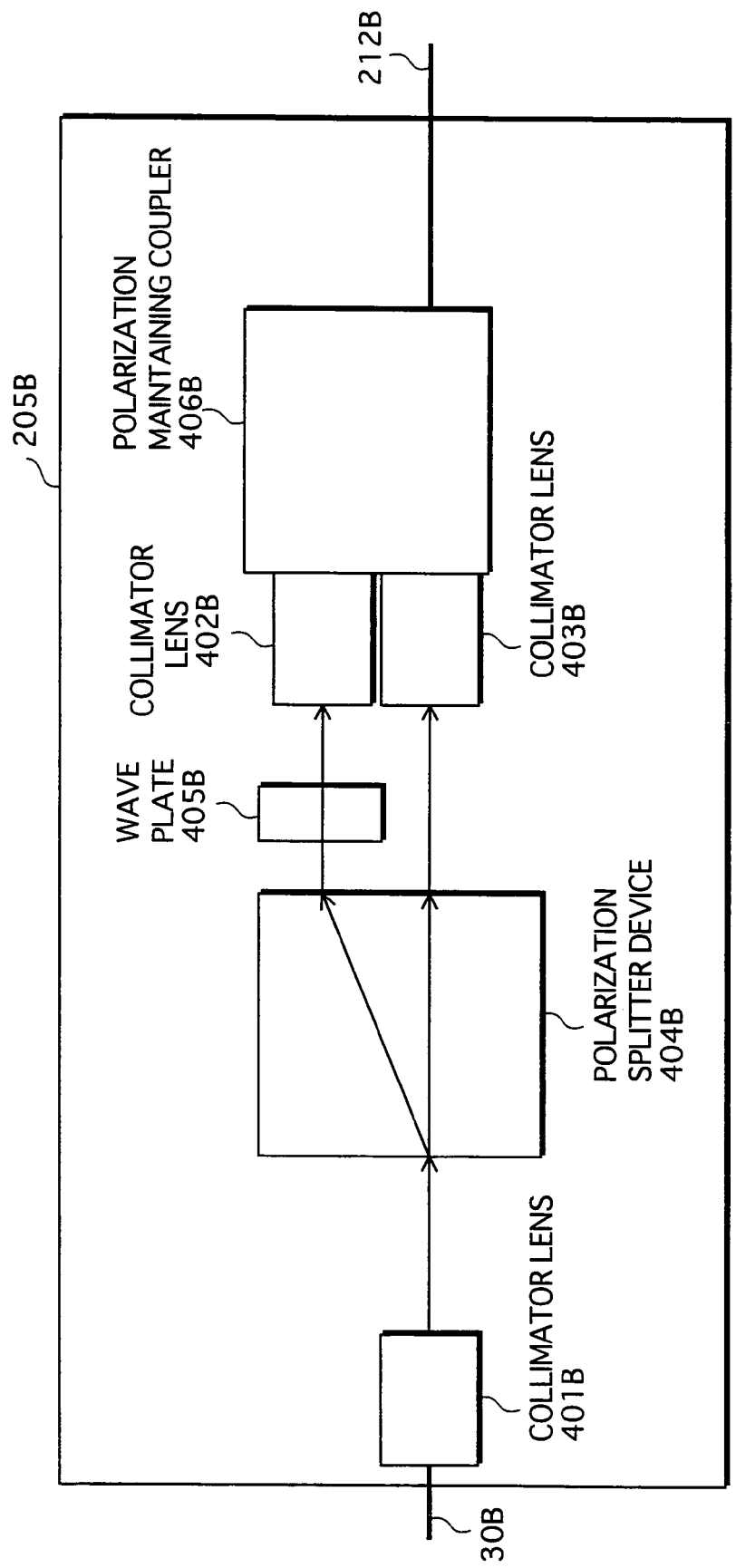
FIG. 8 shows a structure of a polarization control unit 205B.

As FIG. 8 shows, the polarization control unit 205B includes, for instance, collimator lenses 401B, 402B, 403B, a polarization splitter device 404B, a wave plate 405B that changes the polarization type of an optical signal from vertical polarization to horizontal polarization rotatively, and a polarization maintaining coupler 406B. The collimator lens 401B is connected to the optical fiber 30. The polarization maintaining coupler 406B is connected to the polarization maintaining fiber 212B. The polarization splitter device 404B is, for instance, a rutile crystal.

By the collimator lens 401B, the polarization control unit 205B receives an optical signal from the optical transmitter 10B via the optical fiber 30B. Then, by the polarization splitter device 404B, the polarization control unit 205B divides the received optical signal into a vertical optical signal and a horizontal optical signal.

After passing through the polarization splitter device 404B, the vertical optical signal is rotated by the wave plate 405B so as to be a horizontally polarized signal, and the rotated vertical optical signal (hereinafter called the "rotated optical signal") enters the polarization maintaining coupler 406B via the collimator lens 402B.

After passing through the polarization splitter device 404B, the horizontal optical signal enters the polarization maintaining coupler 406B via the collimator lens 403B.

The polarization maintaining coupler 406B combines the rotated optical signal with the horizontal optical signal to generate the combined optical signal, and transmits the combined optical signal to the optical frequency conversion unit 202B via the polarization maintaining fiber 212B.

(2) Optical Frequency Conversion Unit 202B

The optical frequency conversion unit 202B is, more specifically, a chirp type Mach-Zehnder external modulator, and its structure is the same as that of the optical frequency conversion unit 202B in the first embodiment.

The optical frequency conversion unit 202B receives the combined optical signal from the polarization control unit 205B via the polarization maintaining fiber 212B. After that, just as the optical frequency conversion unit 202 in the first embodiment does, the optical frequency conversion unit 202B generates the intensity-modulated optical signal by intensity-modulating the combined optical signal received from the polarization control unit 205B with use of the LO signal received from the LO signal input unit 201B. Then, the optical frequency conversion unit 202B generates the first optical signal and the second optical signal from the generated intensity-modulated optical signal. The optical frequency conversion unit 202B outputs the generated first optical signal to the balanced O/E conversion unit 203B via the optical fiber 210B and outputs the generated second optical signal to the balanced O/E conversion unit 203B via the optical fiber 211B.

2.5.3 Operation of the Optical Transmission System 1B

Receiving an IF signal, requiring transmission, from the IF signal input unit 101B, the E/O conversion unit 102B in the optical transmitter 10B converts the received IF signal into an optical signal, and transmits the generated optical signal to the optical receiver 20B via the optical fiber 30B.

The polarization control unit 205B in the optical receiver 20B receives an optical signal from the optical transmitter 10B via the optical fiber 30B, controls the received optical signal to be a horizontally polarized signal, that is to generate a combined optical signal, and transmits the generated combined optical signal to the optical frequency conversion unit 202B. The optical frequency conversion unit 202B receives the combined optical signal from the polarization control unit 205B, and generates an intensity-modulated optical signal by intensity-modulating the received combined optical signal. Then, the polarization control unit 205B generates the first optical signal and the second optical signal from the generated intensity-modulated optical signal, and outputs the generated first and second optical signals to the balanced O/E conversion unit 203B via the optical fiber 210B and the optical fiber 211B respectively.

Receiving the first and second optical signals from the optical frequency conversion unit 202B, the balanced O/E conversion unit 203B converts the received first and second optical signals into the first and second RF signals respectively. Then, the balanced O/E conversion unit 203B generates the RF signal by reversing the phase of the first RF signal and adding the inverted first RF signal to the second RF signal, and outputs the generated RF signal to the transmission unit 204B. Receiving the RF signal from the balanced O/E conversion unit 203B, the transmission unit 204B transmits the received RF signal to the mobile telephone 40B via the antenna 220B.

2.5.4 Summary of the Optical Transmission System 1B

By providing the polarization control unit 205B in the optical receiver 20B of the optical transmission system 1B, the optical signal can be controlled to be in a polarized type which the optical frequency conversion unit 202B accepts. This realizes a high combining efficiency in the optical frequency conversion unit 202B. In other words, the optical signal can be coupled strongly.

Note that although the optical frequency conversion unit 202B receives a horizontally polarized optical signal in this embodiment, the optical frequency conversion unit 202B may receive a vertically polarized optical signal. In this case, the horizontal optical signal which has passed through the polarization splitter device 404B is rotated, and the rotated horizontal optical signal and the vertical optical signal are combined in order to generate an optical signal which is vertically polarized, and the generated optical signal is to be outputted to the polarization maintaining fiber 212B.

3. Other Modifications

The present invention is described above according to the embodiments. However, the present invention is not limited to the above embodiments as a matter of course. The following cases are included in the present invention.

(1) In the above-described embodiments, the LO signal is inputted in the optical receiver side. However, the present invention is not limited to this.

The LO signal may be inputted in the optical transmitter side. The following is a description of the optical transmission system 1C with this structure.

Figure 9:
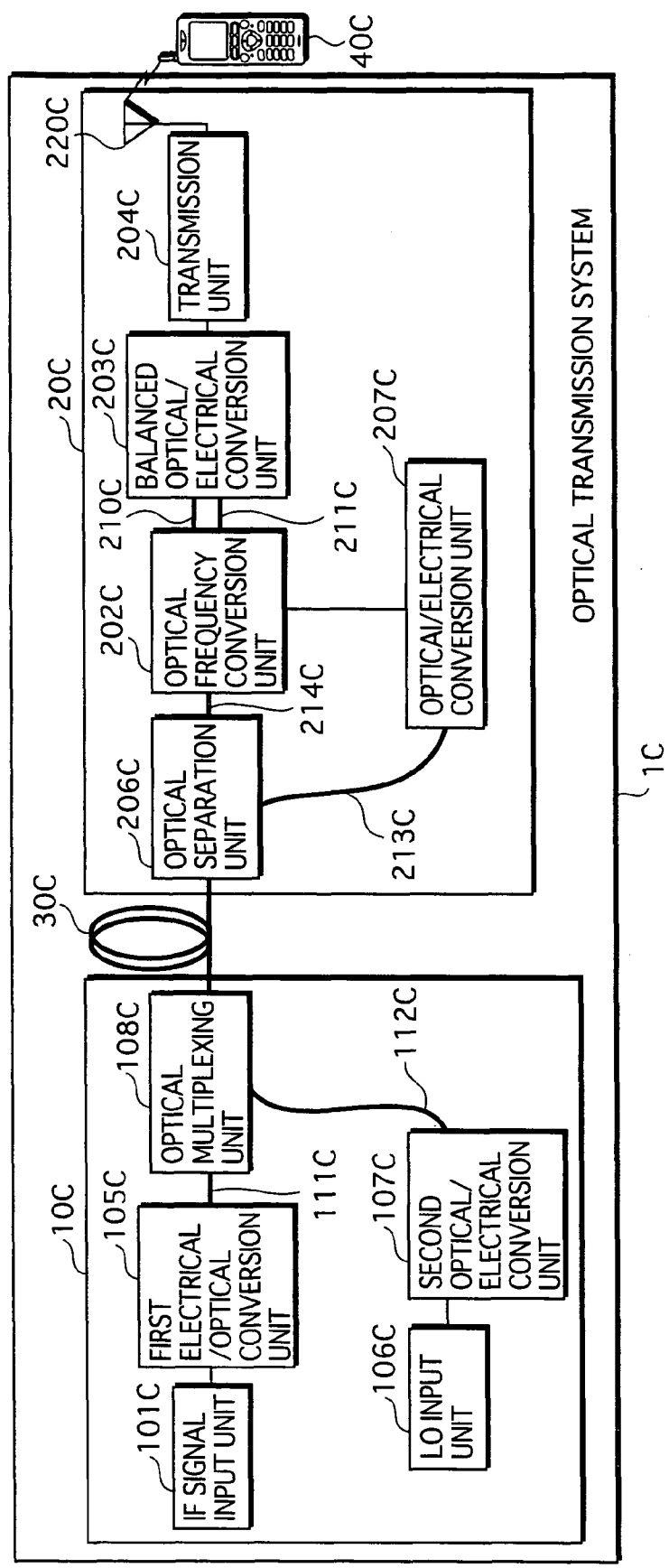
FIG. 9 is a block diagram showing a structure of an optical transmission system 1C.

As FIG. 9 shows, the optical transmission system 1C includes an optical transmitter 10C, an optical receiver 20C and an optical fiber 30C. The optical transmitter 10C and the optical receiver 20C are connected to each other by the optical fiber 30C.

The optical transmitter 10C converts an IF signal into an IF optical signal, and converts an LO signal into an LO optical signal. The optical transmitter 10C multiplexes the IF optical signal and the LO optical signal, and transmits the multiplexed optical signal to the optical receiver 20C via the optical fiber 30C. The optical receiver 20C receives the multiplexed optical signal from the optical transmitter 10C via the optical fiber 30C, generates an RF signal from the received multiplexed optical signal, and transmits the generated RF signal to the mobile telephone 40C.

(A) Structure of the Optical Transmitter 10C

As FIG. 9 shows, the optical transmitter 10C includes an IF signal input unit 101C, a first E/O (electrical/optical) conversion unit 105C, an LO signal input unit 106C, a second E/O conversion unit 107C, and an optical multiplexing unit 108C. The first E/O conversion unit 105C and the optical multiplexing unit 108C are connected to each other by the optical fiber 111C, and the second E/O conversion unit 107C and the optical multiplexing unit 108C are connected to each other by the optical fiber 112C.

The IF signal input unit 101C receives an inputted IF signal which is to be transmitted to the optical receiver 20C, and outputs the received IF signal to the first E/O conversion unit 105C.

The first E/O conversion unit 105C is, more specifically, a semiconductor laser module. Receiving the IF signal from the IF signal input unit 10C, the first E/O conversion unit 105C converts the received IF signal into an IF optical signal, and outputs the generated IF optical signal to the optical multiplexing unit 108C via the optical fiber 111C.

The LO signal input unit 106C receives an inputted LO signal, and outputs the received LO signal to the second E/O conversion unit 107C.

The second E/O conversion unit 107C is, more specifically, a semiconductor laser module. Receiving the LO signal from the LO signal input unit 106C, the second E/O conversion unit 107C converts the received LO signal into an LO optical signal with use of a light having a frequency that is different from that of the IF optical signal, and outputs the generated LO optical signal to the optical multiplexing unit 108C via the optical fiber 112C.

The optical multiplexing unit 108C is, more specifically, an optical multiplexer. The optical multiplexing unit 108C receives the IF optical signal from the first E/O conversion unit 105C via the optical fiber 111C, and receives the LO optical signal from the second E/O conversion unit 107C via the optical fiber 112C. The optical multiplexing unit 108C multiplexes the received IF optical signal and the received LO optical signal to generate an multiplexed optical signal, and outputs the generated multiplexed optical signal to the optical receiver 20C via the optical fiber 30C.

(B) Structure of the Optical Receiver 20C

As FIG. 9 shows, the optical receiver 20C includes an optical frequency conversion unit 202C, a balanced O/E (optical/electrical) conversion unit 203C, a transmission unit 204C having an antenna 220C, an optical separation unit 206C, and an O/E conversion unit 207C. The optical frequency conversion unit 202C and the balanced O/E conversion unit 203C are connected to each other by an optical fiber 210C and an optical fiber 211C, and the optical separation unit 206C and the O/E conversion unit 207C are connected to each other by the optical fiber 213C, and the optical separation unit 206C and the optical frequency conversion unit 202C are connected to each other by the optical fiber 214C.

The balanced O/E conversion unit 203C and the transmission unit 204C are the same as the balanced O/E conversion unit 204 and the transmission unit 204, and therefore the descriptions are omitted here.

The optical separation unit 206C is, more specifically, an optical branching filter. Receiving a multiplexed optical signal from the optical transmitter 10C via the optical fiber 30C, the optical separation unit 206C separates and obtains the IF optical signal and the LO optical signal from the received multiplexed optical signal. The optical separation unit 206C outputs the obtained IF optical signal to the optical frequency conversion unit 202C via the optical fiber 214C, and outputs the obtained LO optical signal to the O/E conversion unit 207C via the optical fiber 213C.

The O/E conversion unit 207C is, more specifically, a photodiode. The O/E conversion unit 207C receives the LO optical signal from the optical separation unit 206C via the optical fiber 213C, and converts the received LO optical signal into an LO signal. The O/E conversion unit 207C outputs the generated LO signal to the optical frequency conversion unit 202C.

The optical frequency conversion unit 202C is, more specifically, a chirp type Mach-Zehnder external modulator, and its structure is the same as that of the optical frequency conversion unit 202 in the first embodiment. The optical frequency conversion unit 202C receives the IF optical signal from the optical separation unit 206C via the optical fiber 214C, and receives LO signal from the O/E conversion unit 207C. Just as the optical frequency conversion unit 202 in the first embodiment does, the optical frequency conversion unit 202C generates the intensity-modulated optical signal by intensity-modulating the IF optical signal received from the optical separation unit 206C with use of the LO signal received from the O/E conversion unit 207C, and generates the first optical signal and the second optical signal from the generated intensity-modulated signal. The optical frequency conversion unit 202C outputs the generated first optical signal to the balanced E/O conversion unit 203C via the optical fiber 210C, and outputs the generated second optical signal to the balanced E/O conversion unit 203C via the optical fiber 211C.

(C) Operation of the Optical Transmission System 1C

Receiving an IF signal requiring transmission from the IF signal input unit 101C, the first E/O conversion unit 105C in the optical transmission system 1C converts the received IF signal into an IF optical signal, and outputs the generated IF optical signal to the optical multiplexing unit 108C.

Receiving the LO signal from the LO signal input unit 106C, the second E/O conversion unit 107C converts the received LO signal into an LO optical signal, and outputs the generated LO optical signal to the optical multiplexing unit 108C. Receiving the IF optical signal from the first E/O conversion unit 105C and the LO optical signal from the second E/O conversion unit 107C respectively, the optical multiplexing unit 108C multiplexes the received IF optical signal and the LO optical signal into the multiplexed optical signal, and outputs the generated multiplexed optical signal to the optical receiver 20C via the optical fiber 30C.

The optical separation unit 206C in the optical receiver 20C receives the multiplexed optical signal from the optical transmitter 10C via the optical fiber 30C, and separates and obtains the IF optical signal and the LO optical signal from the received multiplexed optical signal. The optical separation unit 206C outputs the obtained LO optical signal to the O/E conversion unit 207C, and outputs the obtained IF optical signal to the optical frequency conversion unit 202C.

Receiving the LO optical signal from the optical separation unit 206C, the O/E conversion unit 207C converts the received LO optical signal to the LO signal, and outputs the generated LO signal to the optical frequency conversion unit 202C.

Receiving the IF optical signal from the optical separation unit 206C, the optical frequency conversion unit 202C generates the intensity-modulated optical signal by intensity-modulating the IF optical signal with use of the LO signal received from the O/E conversion unit 207C, and generates the first optical signal and the second optical signal from the generated intensity-modulated optical signal. Then, the optical frequency conversion unit 202C outputs the generated first and second optical signal to the balanced O/E conversion unit 203C via the optical fiber 210C and the optical fiber 211C respectively.

Receiving the first and second optical signal from the optical frequency conversion unit 202C, the balanced O/E conversion unit 203C converts the received first and second optical signals into the first and second RF signals respectively. Then, the balanced O/E conversion unit 203C generates the RF signal by reversing the phase of the first RF signal and adding the inverted first RF signal to the second RF signal, and outputs the generated RF signal to the transmission unit 204C. Receiving the RF signal from the balanced conversion unit 203C, the transmission unit 204C transmits the received RF signal to the mobile telephone 40C via the antenna 220C.

(D) Summary of the Optical Transmission System 1C

With the construction in which the IF signal and the LO signal are optically transmitted at the same time by the optical transmitter 10C in the optical transmission system 1C, the maintenance of the whole system becomes easy.

(2) Note that although the RF signal is transmitted to the mobile telephone by the optical receiver in the above-described embodiments, the present invention is not limited to this. The optical receiver may transmit the RF signal to a computer device which can perform communication, such as a personal computer, or to a broadcasting receiver, such as a TV tuner.

(3) Note that although a semiconductor laser module is described as an example of the E/O conversion unit in the above-described embodiments, the present invention is not limited to this. The E/O conversion unit may be a combination of a semiconductor laser module and a Mach-Zehnder external modulator.

Also, each of the first and second E/O conversion units described above in (1) may be a combination of a semiconductor laser module and a Mach-Zehnder external modulator.

(4) Each of the above-described embodiments and modifications may be combined together.

4. Advantageous Effects of the Invention

As described above, the present invention is an optical transmission system in which an optical signal is transmitted from an optical transmitter to an optical receiver and outputted in a form of an output electrical signal after a noise canceling process is performed, the noise canceling process canceling out noise components which occur during the transmission, wherein the optical receiver and the optical transmitter are connected to each other by one optical fiber, through which an optical signal is transmitted before being intensity-modulated, the optical receiver includes: a first processing unit operable to receive an optical signal, intensity-modulate the received optical signal, and split the intensity-modulated optical signal into two optical signals of which respective intensity-modulated components are in antiphase; first and second optical transmission fibers which transmit the two optical signals respectively; and a second processing unit operable to convert the two optical signals into electrical signals respectively, and generate an output electrical signal by performing differential amplification on the electrical signals.

According to the stated construction, the optical receiver of the optical transmission system can intensity-modulate the received optical signal, generate two optical signals of which the intensity-modulated components are in antiphase with each other, convert the generated two optical signals into electrical signals respectively, and generate the output electrical signal. Accordingly, the optical receiver does not need to receive two optical signals of which the intensity-modulated components are in antiphase with each other, which is different from the conventional optical transmission system. In other words, the optical transmitter and the optical receiver do not need to be connected to each other by two optical fibers, and the construction cost can be reduced. Also, when the optical signals, of which the intensity-modulated components are in antiphase with each other, are converted into electrical signals and the phase of one of the electrical signals is inverted, the two electrical signals become in in phase and the noise components thereof become in anti-phase. Accordingly, the noise components are cancelled out when the output electrical signal is generated, and a high-quality output electrical signal can be realized.

The optical transmitter may include an output processing unit operable to receive an electrical signal, convert the electrical signal into an optical signal, and transmit the optical signal to the optical receiver via the optical fiber.

According to the stated construction, the optical transmitter of the optical transmission system can transmit an optical signal to the optical receiver via only one optical fiber. Therefore, there is no need to output optical signals to respective two optical fibers. This is different from the conventional optical transmission system.

The first processing unit may include: an intensity modulation subunit operable to receive an optical signal via the optical fiber, intensity-modulate the received optical signal based on a modulated electrical signal having a certain frequency, and thereby generate a modulated optical signal; and an optical separation subunit operable to generate, from the modulated optical signal, a first output optical signal and a second output optical signal of which respective intensity-modulated components are in antiphase, and output the first and second output optical signals to the first and second optical fibers respectively, and the second processing unit may include: an optical/electrical conversion subunit operable to convert the first and second output optical signals into first and second electrical signals respectively; and a differential amplification subunit operable to invert a phase of the second electrical signal, add the phase-inverted second electrical signal to the first electrical signal, and thereby generate the output electrical signal.

According to the stated construction, the optical receiver of the optical transmission system can generate the modulated optical signal by intensity-modulating the optical signal with use of the intensity modulation subunit, generate the first and second output optical signals from the modulated optical signal with use of the optical separation subunit, convert the first and second output optical signals into the first and second output electrical signals respectively with use of the optical-electrical conversion subunit, and generate the output electrical signal from the first and second output electrical signals by the differential amplification subunit. This enables the optical receiver to generate an output electrical signal of which the noise components are cancelled out.

The first processing unit may consist of a Mach-Zehnder type external modulator, and the second processing unit may consist of a balanced optical/electrical converter.

According to the stated construction, the optical receiver of the optical transmission system can consist of a Mach-Zehnder type external modulator and a balanced optical/electrical converter.

The electrical signal which the output processing unit receives may be an intermediate frequency signal having a frequency which is different from a frequency of a radio frequency signal, the modulated electrical signal may be a local oscillator signal, the intensity modulation subunit may intensity-modulate the received optical signal based on a frequency of the local oscillator signal, and thereby generate the modulated optical signal of which intensity-modulated components have a frequency of the radio frequency signal, the optical/electrical conversion subunit may convert the first and second output optical signals into the first and second electrical signals respectively, the first and second electrical signals having the frequency of the radio frequency signal, and the differential amplification subunit may invert the phase of the second electrical signal, add the phase-inverted second electrical signal to the first electrical signal, and thereby generate the radio frequency signal.

According to the stated construction, the optical receiver of the optical transmission system can generate the radio frequency signal as the output electrical signal by performing the intensity modulation based on the frequency of the local oscillator signal. This enables the optical receiver to be used as a device which outputs a radio frequency signal.

The output processing unit may include: a generation subunit operable to receive an electrical signal, convert the received electrical signal into an optical signal, and output the optical signal to a third optical transmission fiber; and a polarization scrambler operable to receive the optical signal via the third optical transmission fiber, change a polarization type of the optical signal randomly, and output the optical signal to the optical receiver via the optical fiber.

According to the stated construction, the optical transmitter of the optical transmission system can output an optical signal, of which the polarization randomly changes, to the optical receiver.

The first processing unit may receive an optical signal of which a polarization type changes randomly from the optical transmitter via the optical fiber.

According to the stated construction, the optical receiver of the optical transmission system can receive an optical signal of which the polarization changes randomly from the optical transmitter. This enables the optical receiver to receive an optical signal with stable coupling frequency.

The optical receiver may further include: a polarization control unit operable to receive an optical signal from the optical transmitter via the optical fiber, and control a polarization of the optical signal so that the type of the polarization of the optical signal becomes the same as a type of a polarization which the first processing unit accepts, wherein the first processing unit may receive the optical signal of which the polarization is controlled by the polarization control unit.

According to the stated construction, the optical receiver of the optical transmission system can control the polarization of the received optical signal so that the type of the polarization of the received optical signal becomes the same as the type of the polarization which the first processing unit accepts. This enables the first processing unit to receive an optical signal with stable coupling frequency.

The polarization of the optical signal received by the polarization control unit may include first polarization and second polarization, the polarization which the first processing unit accepts may be the first polarization, the polarization control unit may include: a separation subunit operable to split the optical signal into a first polarized signal having the first polarization and a second polarized signal having the second polarization; a rotation subunit operable to rotate the second polarization of the second polarized signal so as to change the second polarization to the first polarization, and thereby generate a third polarized signal having the first polarization; and a combining subunit operable to combine the first polarized signal with the third polarized signal, and thereby generate a combined optical signal having only the first polarization, and the optical signal of which the polarization is controlled by the polarization control unit may be the combined optical signal.

According to the stated construction, the polarization control unit in the optical receiver of the optical transmission system can generate the combined optical signal of which the polarization consists of only the first polarization, and the first processing unit can generate the first and second optical signals from the combined optical signal. This enables the first processing unit to receive a polarization-controlled optical signal with stable combining efficiency.

The optical transmitter may include: an output processing unit operable to receive an electrical signal, convert the electrical signal into an optical transmission signal, and output the optical transmission signal to a third optical transmission fiber, a conversion processing unit operable to convert a modulated electrical signal having a certain frequency into a modulated optical signal, and output the modulated optical signal to a fourth optical transmission fiber, and a multiplexing unit operable to receive the optical transmission signal via the third optical transmission fiber and the modulated optical signal via the fourth optical transmission fiber respectively, multiplex the optical transmission signal with the modulated optical signal, thereby generate multiplexed optical signal, and output the generated multiplexed optical signal to the optical receiver.

According to the stated construction, the optical transmitter of the optical transmission system can transmit the optical transmission signal and the modulated optical signal to the optical receiver via one optical fiber. This enables the optical receiver to manage the electrical signal and the modulated electrical signal, and therefore the maintenance becomes easy.

The optical receiver may further include: an optical separation subunit operable to receive the multiplexed optical signal from the optical transmitter via the optical fiber, split the multiplexed optical signal into the optical transmission signal and the modulated optical signal, and output the optical transmission signal and the modulated optical signal to the first processing unit and a fifth optical transmission fiber respectively; and a first optical/electrical conversion subunit operable to receive the modulated optical signal via the fifth optical transmission fiber, convert the modulated optical signal into a modulated electrical signal, and output the modulated electrical signal to the first processing unit, the optical signal received by the first processing unit may be the optical transmission signal, the first processing unit may include: an intensity modulation subunit operable to intensity-modulate the received optical transmission signal based on a frequency of the modulated electrical signal, and thereby generate a modulated optical signal; an optical separation subunit operable to generate, from the modulated optical signal, a first output optical signal and a second output optical signal of which respective intensity-modulated components are in antiphase, and output the first and second output optical signals to the first and the second optical fibers respectively, and the second processing unit may include: a second optical/electrical conversion subunit operable to convert the first and second output optical signals into first and second electrical signals respectively; and a differential amplification subunit operable to invert a phase of the second electrical signal, add the phase-inverted second electrical signal to the first electrical signal, and thereby generate the output electrical signal.

According to the stated construction, the optical receiver of the optical transmission system can receive the multiplexed optical signal transmitted from the optical transmitter, and generate the output electrical signal with use of the received multiplexed optical signal. Therefore the maintenance, for instance the management of the optical receiver, becomes easy.

The electrical signal which the output processing unit receives may be an intermediate frequency signal having a frequency which is different from a frequency of a radio frequency signal, the modulated electrical signal maybe a local oscillator signal, the intensity modulation subunit may intensity-modulate the received optical transmission signal based on a frequency of the local oscillator signal so as to generate the modulated optical signal of which intensity-modulated components have a frequency of the radio frequency signal, the second optical/electrical conversion subunit may convert the first and second output optical signals into the first and second electrical signals respectively, the first and second electrical signals having the frequency of the radio frequency signal, and the differential amplification subunit may invert the phase of the second electrical signal, and add the phase-inverted second electrical signal to the first electrical signal so as to generate the radio frequency signal.

According to the stated construction, the optical receiver of the optical transmission system can generate the radio frequency signal as the output electrical signal by the intensity modulation based on the frequency of the local oscillator signal. This enables the optical receiver to be used as a device which outputs the local oscillator signal.

Industrial Applicability

The optical transmission system of the present invention described above is repeatedly and continuously usable in industries which provide information, audio data, video data, and so on to consumers with use of communication systems with optical fibers.

The invention claimed is:

1. An optical transmission system that includes an optical transmitter and an optical receiver connected to the optical transmitter via an optical fiber, and outputs a radio-frequency electrical signal having a radio frequency from the optical receiver, the optical transmitter comprising:
  an electrical/optical converter operable to generate an intermediate-frequency optical signal that has been intensity-modulated based on an intermediate-frequency electrical signal having an intermediate frequency different from the radio frequency, and output the generated intermediate-frequency optical signal to the optical receiver via the optical fiber,
  the optical receiver comprising:
  a frequency converter operable to generate a first radio-frequency optical signal and a second radio-frequency optical signal by intensity-modulating and thereby frequency-converting the intermediate-frequency optical signal based on a local oscillator electrical signal having a constant frequency, the first and second radio-frequency optical signals each including an intensity-modulated component having the radio frequency and a noise component, the intensity-modulated components being in antiphase, and the noise components being in phase; and
  a balanced optical/electrical converter operable to generate a radio-frequency electrical signal by converting the first radio-frequency optical signal to a first electrical signal, converting the second radio-frequency optical signal to a second electrical signal, inverting a phase of the first electrical signal, and adding the first electrical signal to the second electrical signal so that noise components of the first and second electrical signals are cancelled out.

2. The optical transmission system of claim 1, wherein the local oscillator electrical signal has a frequency based on which the intermediate-frequency electrical signal is frequency-converted to the radio-frequency electrical signal.

3. The optical transmission system of claim 2, wherein the optical transmitter further comprises:

a second electrical/optical converter operable to generate a local oscillator optical signal that has a wavelength different from a wavelength of the intermediate-frequency optical signal and has been intensity-modulated based on the local oscillator electrical signal having the constant frequency; and a multiplexer operable to generate a multiplexed optical signal by multiplexing the intermediate-frequency optical signal generated by the electrical/optical converter with the local oscillator optical signal generated by the second electrical/optical converter, and output the multiplexed optical signal to the optical receiver via the optical fiber, and the optical receiver further comprises:

a separation unit operable to separate the multiplexed optical signal into the intermediate-frequency optical signal and the local oscillator optical signal; and an optical/electrical converter operable to convert the local oscillator optical signal to the local oscillator electrical signal.

4. The optical transmission system of claim 3, wherein the frequency converter consists of a Mach-Zehnder type external modulator.

5. An optical transmission method used in an optical transmission system that includes an optical transmitter and an optical receiver connected to the optical transmitter via an optical fiber and outputs a radio-frequency electrical signal having a radio frequency from the optical receiver, the optical transmission method comprising the steps of:

in optical transmitter, generating an intermediate-frequency optical signal that has been intensity-modulated based on an intermediate-frequency electrical signal having an intermediate frequency different from the radio frequency, and outputting the generated intermediate-frequency optical signal to the optical receiver via the optical fiber, and in the optical receiver, generating a first radio-frequency optical signal and a second radio-frequency optical signal by intensity-modulating, and thereby frequency-converting, the intermediate-frequency optical signal based on a local oscillator electrical signal having a constant frequency, the first and second radio-frequency optical signals each including an intensity-modulated component having the radio frequency and a noise component, the intensity-modulated components being in antiphase, and the noise components being in phase; and generating a radio-frequency electrical signal by converting the first radio-frequency optical signal to a first electrical signal, converting the second radio-frequency optical signal to a second electrical signal, inverting a phase of the first electrical signal, and adding the first electrical signal to the second electrical signal so that noise components of the first and second electrical signals are cancelled out.

6. The optical transmission method of claim 5, wherein the local oscillator electrical signal has a frequency based on which the intermediate-frequency electrical signal is frequency-converted to the radio-frequency electrical signal.

7. The optical transmission method of claim 6 further comprising the steps of:

in the optical transmitter, generating a local oscillator optical signal that has a wavelength different from a wavelength of the intermediate-frequency optical signal and has been intensity-modulated based on the local oscillator electrical signal having the constant frequency; and generating a multiplexed optical signal by multiplexing the intermediate-frequency optical signal with the local oscillator optical signal, and outputting the multiplexed optical signal to the optical receiver via the optical fiber, and in the optical receiver:

separating the multiplexed optical signal into the intermediate-frequency optical signal and the local oscillator optical signal; and converting the local oscillator optical signal to the local oscillator electrical signal.

8. The optical transmission method of claim 7, wherein the step of generating the first radio-frequency optical signal and the second radio-frequency optical signal by intensity-modulating and thereby frequency-converting the intermediate-frequency optical signal based on the local oscillator electrical signal is performed with use of a Mach-Zehnder type external modulator.

* * * * *